GLENN W. MOORE
INVENTOR.

BY John O. Evans, Jr.
ATTORNEY

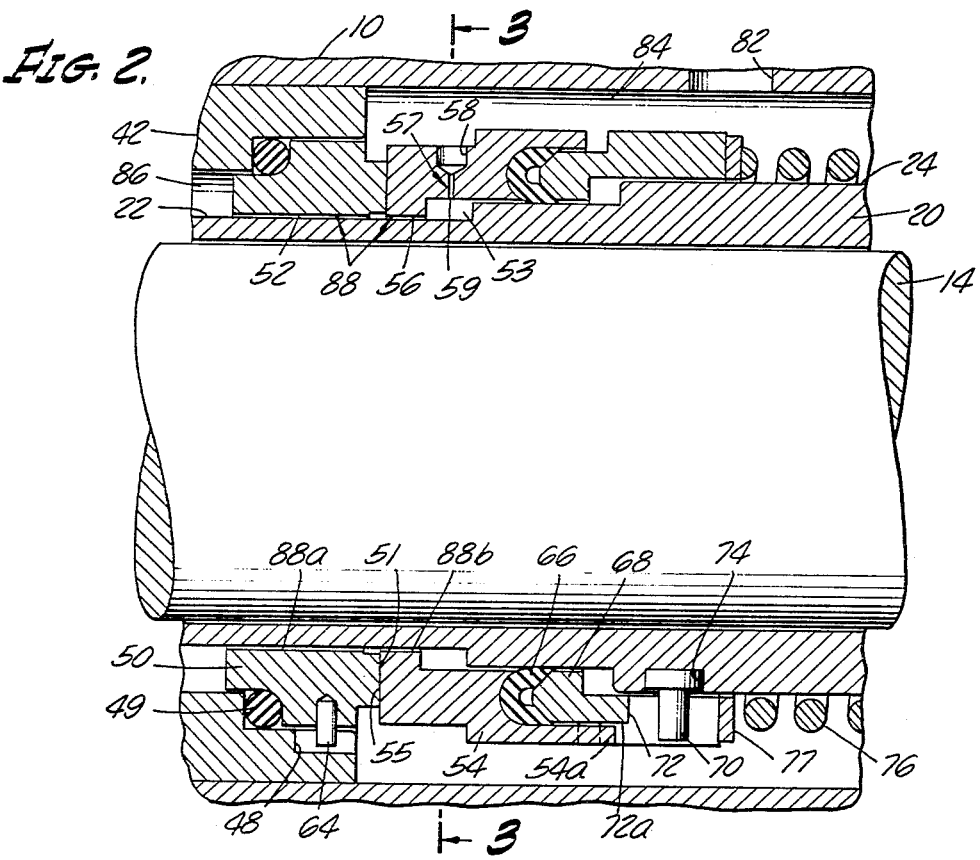
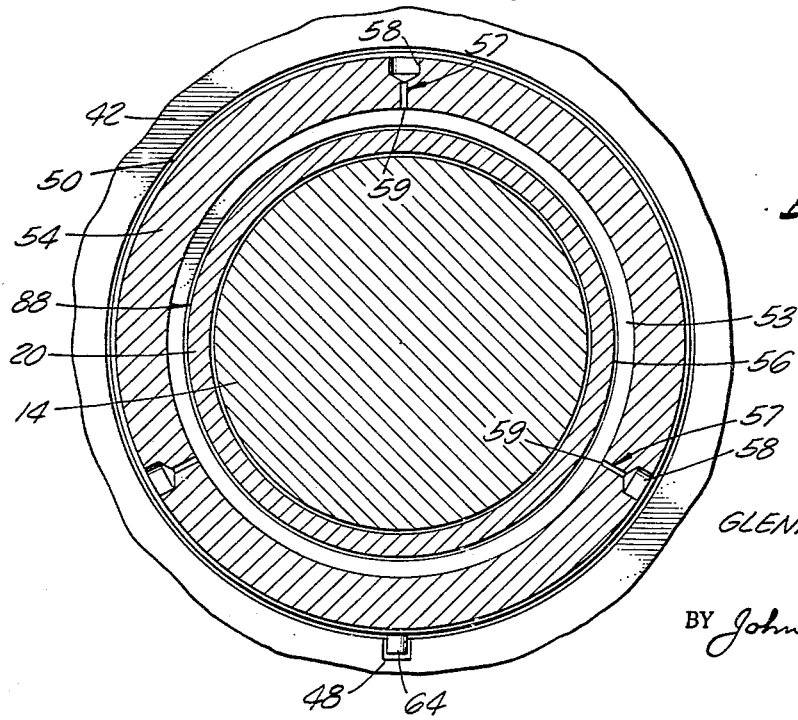

Dec. 16, 1969  G. W. MOORE  3,484,113
MECHANICAL SEAL WITH FLUSHING ARRANGEMENT
Filed Feb. 8, 1967  3 Sheets-Sheet 3
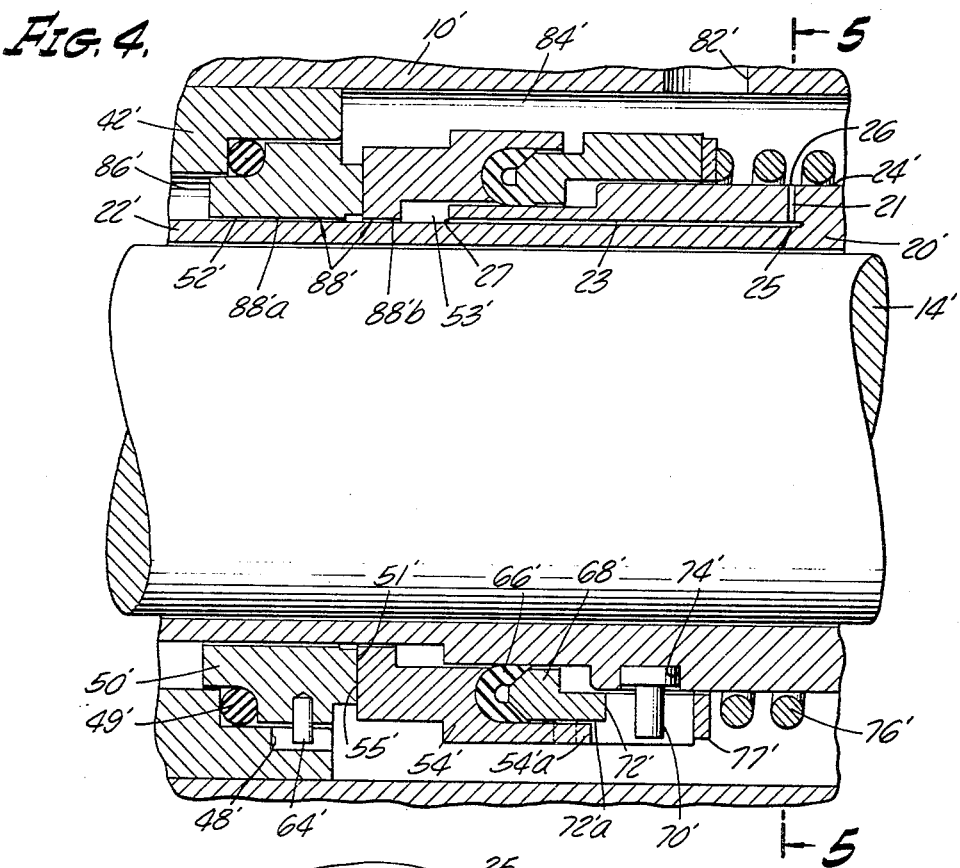
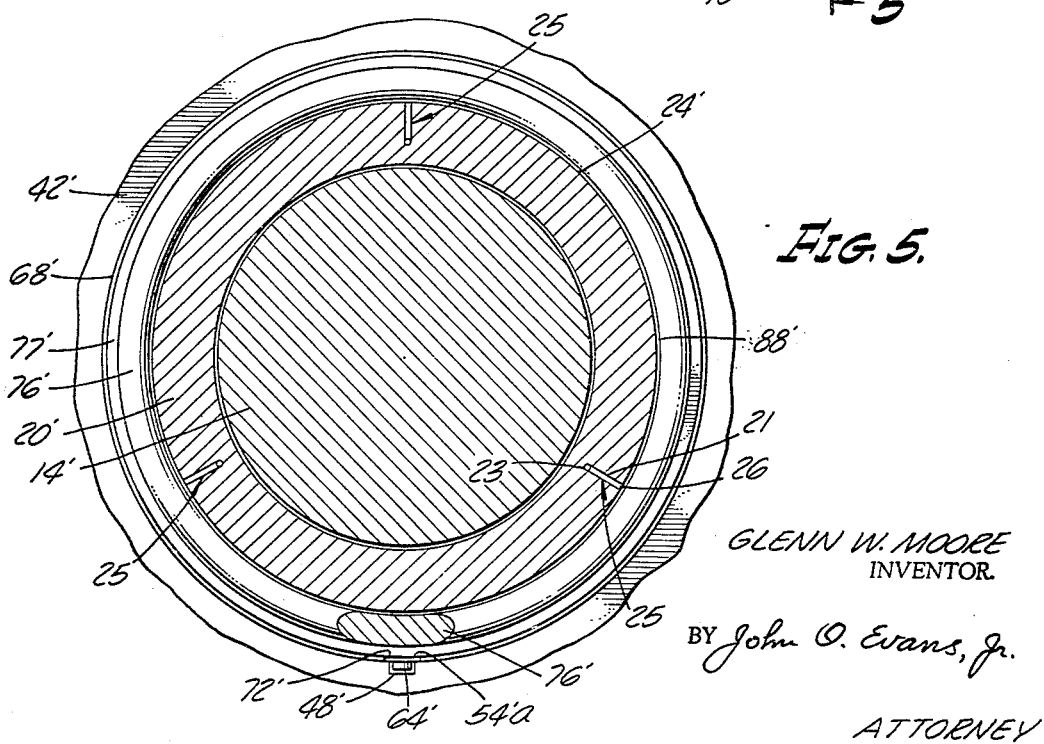
GLENN W. MOORE
INVENTOR.
BY John O. Evans, Jr.
ATTORNEY

United States Patent Office 3,484,113
Patented Dec. 16, 1969

3,484,113
MECHANICAL SEAL WITH FLUSHING ARRANGEMENT
Glenn W. Moore, Beaumont, Tex., assignor to Borg-Warner Corporation, Chicago, Ill., a corporation of Illinois
Filed Feb. 8, 1967, Ser. No. 614,628
Int. Cl. F16j *15/34, 15/54*
U.S. Cl. 277—62                                      13 Claims

ABSTRACT OF THE DISCLOSURE

A mechanical seal for sealing a rotatable shaft to a wall, such as a pump housing wall separating a high pressusre fluid zone in a stuffing box from a lower pressure fluid zone in a pump chamber, and provision for fluid flow from the first-mentioned to the second-mentioned zone to flush away deleterious or abrasive material from the annular sealing interface, thus precluding undue wear of the seal components.

BACKGROUND OF THE INVENTION

This invention relates to mechanical seals, and in particular to mechanical seals as used for sealing between a housing and a rotating shaft, especially where abrasive or otherwise deleterious material may accumulate adjacent to the seals and result in excessive wear.

Shaft packing, packed in the annular space between the rotating shaft and housing of a pump has long been used to prevent leakage of pumped fluids. In order to reduce friction, leakage, and maintenance, various types of mechanical seals have been devised, generally employing relatively rotating sealing elements, with the contacting annular faces lapped to extremely highly polished finishes. One of the sealing rings is fixed or non-rotating, the complementary ring being mounted on the shaft or a shaft sleeve for rotation; and one of the rings is mounted for axial movement and loaded, generally by a spring of some type, to assure continuous contact of the mating sealing ring faces as wear occurs. For additional effectiveness, mechanical seals are sometimes used in pairs or dually, both seals sealing the same stuffing box between the same shaft and housing. One problem which this invention overcomes that has been encountered in the use of mechanical seals is the accumulation and entrapment between the shaft and seal of abrasive or otherwise deleterious materials, resulting in erosion or corrosion of the shaft or shaft sleeve, the inner surfaces of the seal rings and the seal interface, so that the life of the seals is reduced and increased maintenance and repair required.

In an actual test with a double mechanical sseal installed on a slurry pump, the seal was modified to provide the flushing arrangement of this invention. Prior to the modification, the pump was shut down on the average of every two weeks for repair or replacement of parts damaged by grit from the slurry adjacent to the seal components. Subsequent to modification, the seal was still in operation without maintenance after several months.

SUMMARY OF THE INVENTION

It is one of the objects of this invention to provide a mechanical seal from which any accumulated grit or other harmful abrasive or chemical material is continuously flushed out during the operation of the seal, and to effect this objective without the need for costly supplementary equipment.

Another object of the invention is to provide a mechanical seal which precludes leakage of pumped fluids into the atmosphere and prevents wear of moving parts by flushing deleterious material from the seal assembly.

A further object of this invention is to provide a mechanical seal, the circulating cooling fluid for which also serves to cool and to flush out harmful materials from the seal components to prolong the service life of the latter.

An additional object of the invention is to provide a mechanical seal, the normal operation of which in rotating provides a sweeping flow in the annular space between the seal and shaft to cool the contacted parts and to continuously wash out deleterious materials which could otherwise damage or wear the contacted parts.

The invention is embodied in a mechanical seal for sealing a rotatable shaft to a wall with an opening through which the shaft extends, the wall separating a fluid zone under pressure from another fluid zone under lower pressure, the latter fluid including material harmful to the mechanical seal components. The seal includes a stationary sealing ring encircling the shaft and sealingly mounted on the wall, and a rotary sealing ring encircling the shaft and sealingly mounted to it, the rings having a pair of generally radial, opposed, relatively rotatable sealing surfaces matable to provide an annular sealing interface, the outer periphery of which is exposed to one of the fluid zones and the inner periphery to the other. One of the rings is axially movable, and by resilient means is urged toward the other to mate the complementary surfaces. Fluid passage means independent of the annular sealing interface for conducting fluid from the first into the second zone are provided with a discharge port or outlet for discharging the fluid into the low pressure zone at a location to flush the harmful fluid away from the seal interface.

Brief description of the drawings

Referring to the accompanying drawings:

FIG. 2 is a fragmentary view of a portion of FIG. 1, on an enlarged scale, showing in greater detail the preferred embodiment of the invention;

FIG. 3 is a transverse sectional view, taken along the line 3—3 of FIG. 2, and looking in the direction of the arrows;

FIG. 4 is a fragmentary longitudinal cross-sectional view, on the same scale as FIGS. 2 and 3, showing a second embodiment of the seal of the invention; and FIG. 5 is a transverse sectional view, taken along the line 5—5 of FIG. 4, and looking in the direction of the arrows.

DESCRIPTION OF THE PREFERRED EMBODIMENTS

Figure 1:
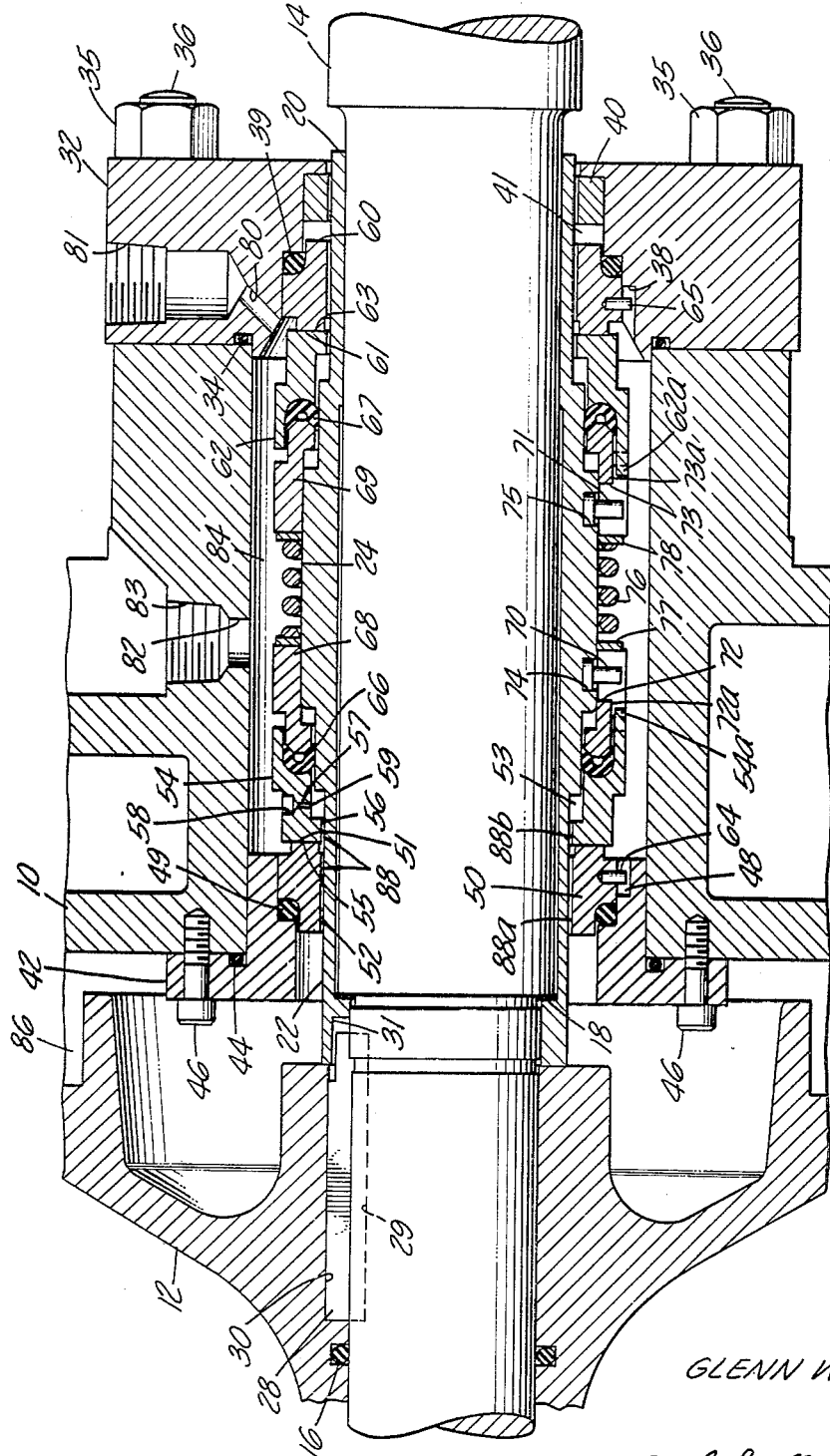
FIG. 1 is a longitudinal cross-sectional view through a stuffing box, showing a preferred embodiment of the mechanical seal of the invention.

The embodiment of FIGS. 1 to 3

Referring to FIGS. 1 to 3, a portion of a pump and its stuffing box are shown, the pump housing wall portion 10 having an opening through which the rotatable pump shaft 14 extends, the shaft having a concentric shaft sleeve 20 sealed to it with a gasket 18; and the shaft and sleeve assembly are keyed with a common key 28 to a pump impeller 12, which is sealed to the shaft 14 by means of a shaft seal 16. The key 28 fits into the shaft keyway 29, impeller keyway 30, and sleeve keyway 31, so that the three parts may rotate together. The impeller 12 is disposed within the pump chamber 86, and separated from the stuffing box at the inboard end by a wall plate 42 sealed to the housing wall 10 by the wall plate gasket 44 and attached to it by means of screws 46. To the outboard end of the stuffing box the seal flange wall 32 is bolted to the housing wall 10 by means of bolts 36 and nuts 35, and sealed against leakage by means of a seal flange gasket 34.

A bushing 40, such as a labyrinth packing, is inserted inside the opening in the seal flange wall 32, and seals against leakage along the shaft 14 of low-pressure fluid in the collection chamber 41. The shaft 14 is journaled at its outboard end in bearings (not shown).

As thus arranged, a generally cylindrical stuffing box chamber 84 is formed by a portion of the inside surface of the housing 10, the outside surface of the shaft sleeve 20, the wall plate 42 at the inboard end and the seal flange 32 at the outboard end. As shown in FIG. 1, the enclosed chamber 84 is sealed from the pump housing chamber 86 by the inboard end or subassembly of a double mechanical seal and sealed from atmosphere by the outboard end or subassembly of the seal. A first or inboard stationary face ring 50 is positioned around the shaft sleeve 20, its bore 52 being a little larger than the end diameter 22 of the sleeve 20, and is sealed to the wall plate 42 by an inboard seat gasket 49 and keyed to it to prevent rotation by means of an inboard lock pin 64 engaged in a keyway 48 of the plate 42. The inboard or first rotary face ring 54 is placed with its radial sealing face 55 in complementary alignment with the radial sealing face 51 of the ring 50, and its inner bore 56 is also a little larger than the diameter 22 of the sleeve 20. Thus, there is provided an annular passage 88 between the shaft sleeve 20 and the stationary face ring 50 and adjacent portion of the rotary ring 54. This annular passage 88 communicates at one end with the pump chamber 86 and at the other end with an annular flushing fluid distribution chamber 53, defined by portions of the rotary sealing ring 54 and opposed portions of the shaft sleeve 20. The annular passage 88 consists of a stationary face annular passage 88a and a rotary face annular passage 88b. The rotary ring 54 is sealed against the shaft sleeve 20 by means of an inboard U-cup 66, backed up by an inboard seal drive 68 which is slotted with a slot 72 into which fits an inboard drive pin 70, in turn fixed into a shaft sleeve recess 74; and the seal drive 68 also includes a slot 72a into which fits an inboard face ring tang 54a extending from the rotary face ring 54. The slots 72, 72a allow the seal ring drive 68 to move axially. As thus keyed together, the rotary ring 54 and seal drive 68 may then rotates together with the shaft sleeve 20.

At the outboard end of the chamber 84, a second or outboard stationary face ring 60 is positioned around the shaft sleeve 20, sealed to the flange 32 by an outboard seat gasket 39 and keyed to it against rotation by an outboard lock pin 65 engaged in a keyway 38 of the flange 32. An outboard or second rotary face ring 62 is placed with its radial sealing face 63 in complementary alignment with the radial sealing face 61 of the stationary ring 60. The rotary ring 62 is sealed against the sleeve 20 by means of an outboard U-cup 67, backed up by an outboard seal drive 69, and keyed for rotation with the shaft sleeve 20 by an outboard drive pin 71 fitted into an outboard shaft sleeve recess 75 and a slot 73 in the outboard seal drive 69. The outboard seal drive 69 also has a slot 73a into which fits an outboard tang 62a extending from the outboard rotary face ring 62. The slotted and keyed parts allow axial movement of the outboard seal drive 69 and provide for rotation together of the latter with the rotary ring 62 and shaft sleeve 20. Around the larger center diameter 24 of the sleeve 20 is located a compression spring 76 pushing against an inboard pusher ring 77 and an outboard pusher ring 78 to bias into interfacial sealing alignment the inboard sealing faces 51 and 55 and the outboard sealing faces 61 and 63.

As seen also in FIG. 1, provision is made for circulation of fluid in the chamber 84 from a reservoir source under pressure (not shown), the reservoir outlet connected to a threaded connection 81 and its inlet to a threaded connection 83, the circulating or cooling fluid entering the enclosed stuffing box chamber 84 through the chamber inlet 80 and exiting through its outlet 82.

In accordance with the invention and as seen in FIG. 3, the flushing-fluid conduits 57 are provided in the rotary sealing ring 54. The number of such conduits is not critical, and fewer or more may be employed to provide the desired flushing. The radially outer end of each conduit 57 opens into an enlarged flushing-fluid inlet 58, and the radially inner end of the conduit 57 forms an outlet 59 for discharging fluid into the flushing-fluid distribution chamber 53. The chamber 53 communicates with the rotary face annular passage 88b, through which flushing fluid flows on its way to the pump chamber 86.

In operation of the embodiments of FIGS. 1 to 3, a source of fluid, particularly liquid, under pressure is connected as hereinbefore described, to cause cooling liquid to flow in at the inlet tap 81, through the stuffing box chamber 84 and out at the outlet tap 83. The pressure in the first zone or stuffing box chamber 84 is maintained higher than that in the second zone or pump housing chamber 86. The pressure in the stuffing box chamber is also higher than the external pressure, which is atmospheric pressure. With the shaft 14 rotating, liquid from the stuffing box chamber 84 flows at a relatively low rate between the sealing surfaces 61 and 63 of the outboard mechanical seal to cool the surfaces and to provide a thin film of liquid therebetween which serves as a lubricant. As is well known, the rate of flow in normal operation may be of the order of from a few drops to a few cubic centimeters of liquid per minute. The lubricating and cooling liquid issuing from between the sealing surfaces flows between the shaft sleeve 20 and the stationary sealing ring 60 and into the collection chamber 41, from which it is withdrawn through the usual drain passage (not shown).

A similar flow of cooling and lubricating liquid takes place between the sealing surfaces 51 and 55 of the inboard mechanical seal. This portion of liquid flows through the stationary ring annular passage 88a to the pump chamber 86. Owing to the low rate of flow of this portion of liquid through the passage 88a, that flow alone is insufficient to effectively flush the annular passage 88a. In the absence of effective flushing, grit or other deleterious materials can intrude from the pump chamber 86 into the space between the shaft sleeve 20 and the inboard sealing rings 50 and 54 and damage these components. Moreover, as the sealing rings rotate relative to one another, the sealing surfaces 51 and 55 wear and produce fine solid particles that may accumulate and damage the seal components or prevent their proper functioning.

The present invention provides additional flushing for the inboard mechanical seal that largely precludes damage from abrasive or corrosive materials. Additional cooling is also afforded by a larger flow of liquid. Because the pressure is higher in the stuffing box chamber 84 than in the pump chamber 86, liquid flows from the stuffing box chamber into the fluid conduit 57 as funneled through the enlarged inlet 58. This liquid fills the distribution chamber 53, from which it flows in an annular stream through the rotary ring annular passage 88b. This annular stream issues from the passage 88b and, with the shaft rotating, is injected with a sweeping motion into the stationary ring annular passage 88a past the inner periphery of the sealing interface 51, 55. This stream of flushing liquid joins the liquid issuing from the sealing interface 51, 55 to form a composite stream of liquid that moves with a swirling motion through the annular passage 88a to the pump chamber 86. The flushing liquid from the distribution chamber 53 is forced, because of the pressure differential between the stuffing box chamber 84 and the pump chamber 86, to flow into the rotary ring annular passage 88b, where it flows, generally axially, with a sweeping force on past the inner periphery of the sealing ring interface 51, 55, at which point the relative rotation of the shaft sleeve 20 and the inboard stationary ring 50 effects a sweeping flow through the stationary annular ring passage 88a, resulting in a turbulent flushing or washing to remove abrasive or harmful grit or chemicals from the seal components, effectuating reduced erosion and corrosion, and therefore greatly enhanced service life and infrequent maintenance.

The stream of liquid from the stuffing box chamber 84 passes across a portion of the inner surface of the rotary ring 54 and the inner surface of the stationary ring 50 to provide additional cooling of these components.

From the foregoing description it is seen that the embodiment of the invention shown in FIGS. 1 to 3 seals fluid under pressure in the pump cavity 86 against flow to the exterior of the housing along the shaft 14.

The embodiment of FIGS. 4 and 5

FIGS. 4 and 5 show another form of an inboard mechanical seal subassembly which may be substituted for the inboard mechanical seal subassembly of the double mechanical seal of FIGS. 1 to 3. Parts in FIGS. 4 and 5 which correspond to like or similar parts in FIGS. 1 to 3 are designated by corresponding reference prime numerals. Except for the shaft sleeve 20' and the inboard rotary sealing ring 54', the parts shown in FIGS. 4 and 5 are identical to the corresponding parts of FIGS. 1 to 3.

Referring to FIG. 4, the inboard rotary sealing ring 54' shown therein has no fluid conduits for conducting flushing fluid from the stuffing box chamber 84' into the annular distribution chamber 53'. Otherwise, the rotary sealing ring 54' is like the inboard rotary sealing ring 54 of FIGS. 1 to 3.

Referring to FIGS. 4 and 5, the shaft sleeve 20' provides the fluid conduits, designated by the general reference numeral 25, through which the flushing fluid flows from the stuffing box chamber 84' into the annular distribution chamber 53'. Each fluid conduit 25 has a longitudinal bore 23 terminating at one end in an outlet 27 communicating with the annular distribution chamber 53'. The other end of the bore 23 is intersected by a radial bore 21 having an inlet 26 for admitting liquid from the stuffing box chamber 84'.

It will be apparent from a comparison of FIGS. 4 and 5 with FIGS. 1 to 3 that the inboard mechanical seal subassembly of FIGS. 4 and 5 operates in substantially the same way as the inboard mechanical seal subassembly of FIGS. 1 to 3 and achieves substantially the same results.

While two forms of mechanical seals with flushing arrangements of the invention have been shown and described, they should be considered as merely exemplary of the invention. Although the flushing arrangement of the present invention has been disclosed hereinabove in association with the inboard mechanical seal subassembly of a double mechanical seal, it will be evident that the invention may be applied to any single mechanical seal that seals a rotary shaft to a partition or wall which separates two bodies of fluids at different pressures.

I claim:

1. A mechanical seal for sealing a rotatable shaft to a wall having an opening through which the shaft extends, the wall separating a first zone containing fluid under pressure and a second zone containing fluid under a lower pressure, which latter fluid is harmful to the mechanical seal components, comprising, in combination:
   (a) a stationary sealing ring adapted to be sealingly mounted on the wall and encircling the shaft;
   (b) a rotary sealing ring adapted to be sealingly mounted on the shaft and encircling the shaft;
   (c) said sealing rings having a pair of generally radial, opposed, relatively rotatable sealing surfaces matable to provide an annular sealing interface therebetween having an outer periphery exposed to fluid in one of said zones and an inner periphery exposed to fluid in the other of said zones;
   (d) one of said rings being axially movable toward the other to mate said sealing surfaces; and
   (e) resilient means for urging said one ring axially toward the other to mate said sealing surfaces;

wherein the improvement comprises:
   fluid passage means independent of said annular sealing interface for conducting fluid from said first zone into said second zone, said fluid passage means having a fluid outlet for discharging fluid into said second zone at a location to flush harmful fluid away from said annular sealing interface.

2. A mechanical seal as defined in claim 1 wherein one of said rings provides at least a portion of said fluid passage means.

3. A mechanical seal as defined in claim 1 wherein said rotary sealing ring provides at least a portion of said fluid passage means.

4. A mechanical seal as defined in claim 1 wherein the outer periphery of the annular sealing interface is exposed to fluid in said first zone, said stationary sealing ring and a portion of said rotary sealing ring adjacent to said stationary sealing ring are radially spaced from the shaft to provide an annular passage forming an extension of the second zone, said rotary sealing ring provides at least a portion of said fluid passage means and said fluid outlet is positioned to discharge fluid into said annular passage.

5. A mechanical seal as defined in claim 1 wherein said shaft includes a sleeve sealed to the shaft, said sleeve providing at least a portion of said fluid passage means.

6. A mechanical seal as defined in claim 1 wherein the outer periphery of the annular sealing interface is exposed to fluid in said first zone, said stationary sealing ring and a portion of said rotary sealing ring adjacent to said stationary sealing ring are radially spaced from said sleeve to provide an annular passage forming an extension of the second zone, said sleeve provides at least a part of said fluid passage means and said fluid outlet is positioned to discharge fluid into said annular passage.

7. A mechanical seal as defined in claim 1 wherein the outer periphery of the annular sealing interface is exposed to fluid in said first zone, said stationary sealing ring and a portion of said rotary sealing ring adjacent to said stationary sealing ring are radially spaced from the shaft to provide an annular passage forming an extension of the second zone, and said fluid passage means includes an annular fluid distribution chamber having an annular outlet positioned to discharge fluid into said annular passage.

8. A mechanical seal as defined in claim 7 wherein said rotary sealing ring provides a portion of said fluid passage means for conducting fluid from said first zone to said distribution chamber.

9. A mechanical seal as defined in claim 7 wherein said shaft includes a sleeve sealed to the shaft, said sleeve providing a portion of said fluid passage means for conducting fluid from said first zone to said distribution chamber.

10. A device for sealing a rotatable shaft to a housing wall having an opening through which the shaft extends, to prevent leakage from the housing through the opening of fluid under pressure in the housing comprising, in combination:
   (a) an inboard mechanical seal subassembly for sealing the shaft to the wall;
   (b) an outboard mechanical seal subassembly axially spaced from said inboard subassembly and sealing the shaft to the wall;
   (c) said subassemblies defining with said shaft and said wall an enclosed chamber adapted to contain fluid at a pressure higher than the pressure of the fluid in the housing;
   (d) said inboard mechanical seal subassembly comprising:
      (i) a stationary sealing ring adapted to be sealingly mounted on the wall and encircling the shaft,
      (ii) a rotary sealing ring adapted to be sealingly mounted on the shaft and encircling the shaft,
      (iii) said sealing rings having a pair of generally radial, opposed, relatively rotatable sealing surfaces matable to provide an annular sealing interface therebetween having one of its peripheries exposed to fluid in said chamber and the other of its peripheries exposed to fluids in the housing,
(iv) one of said rings being axially movable toward the other to mate said sealing surfaces, and
(v) resilient means for urging said one ring axially toward the other to mate said sealing surfaces;
wherein the improvement comprises:
fluid passage means independent of said annular sealing interface for conducting fluid from said enclosed chamber into said housing, said fluid passage means having a fluid outlet for discharging fluid into said housing at a location to flush fluid in said housing away from said annular sealing interface.

11. A mechanical seal as defined in claim 10 wherein the outer periphery of the annular sealing interface is exposed to fluid in said enclosed chamber, said stationary sealing ring and a portion of said rotary sealing ring adjacent to said stationary sealing ring are radially spaced from the shaft to provide an annular passage forming an extension of the housing, and said fluid passage means includes an annular fluid distribution chamber having an annular outlet positioned to discharge fluid into said annular passage.

12. A mechanical seal as defined in claim 11 wherein said rotary sealing ring provides a portion of said fluid passage means for conducting fluid from said enclosed chamber to said distribution chamber.

13. A mechanical seal as defined in claim 11 wherein said shaft includes a sleeve sealed to the shaft, said sleeve providing a portion of said fluid passage means for conducting fluid from said enclosed chamber to said distribution chamber.

References Cited

UNITED STATES PATENTS

| | | | |
|---|---|---|---|
| 2,824,759 | 2/1958 | Tracy | 277—87 X |
| 3,031,197 | 4/1962 | Wilkinson | 277—74 X |
| 3,093,382 | 6/1963 | Macks | 277—96 X |

FOREIGN PATENTS

| | | |
|---|---|---|
| 920,892 | 3/1963 | Great Britain. |

LAVERNE D. GEIGER, Primary Examiner

J. S. MEDNICK, Assistant Examiner

U.S. Cl. X.R.

277—65, 75, 93, 86